Figure 1:
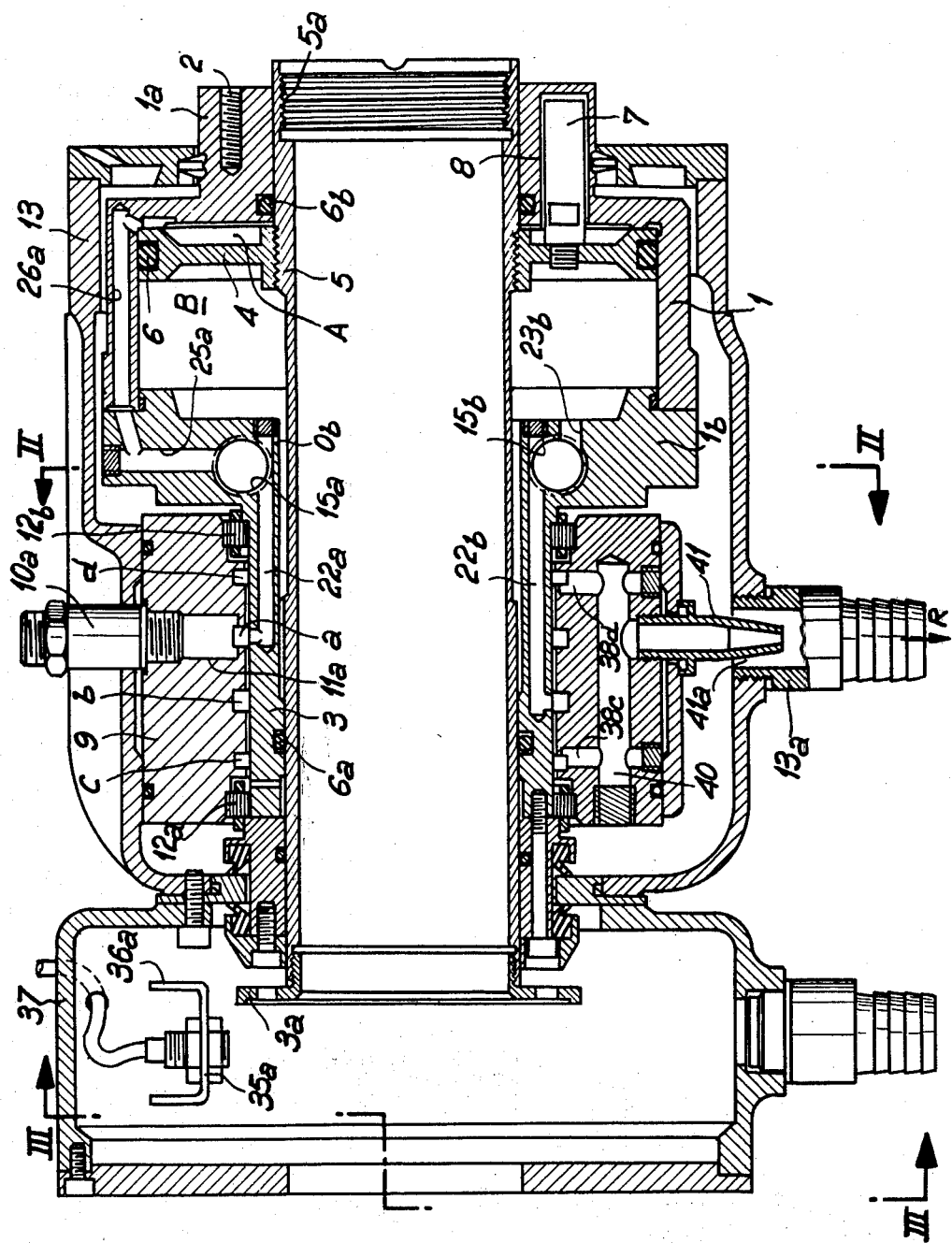

United States Patent [19]

Le Moal

[11] 4,249,451
[45] Feb. 10, 1981

[54] ROTARY HYDRAULIC JACK DEVICE

[75] Inventor: Jean P. Le Moal, Bougival, France

[73] Assignee: La Precision Industrielle, Hauts-de-Seine, France

[21] Appl. No.: 921,098

[22] Filed: Jun. 30, 1978

[30] Foreign Application Priority Data

Apr. 7, 1977 [FR] France .................. 77 20474

[51] Int. Cl.³ .................. F01B 31/12; F15B 13/042
[52] U.S. Cl. .................. 91/1; 91/420; 92/86; 92/106
[58] Field of Search .................. 91/1, 420; 92/86, 106; 279/4

[56] References Cited

U.S. PATENT DOCUMENTS

| 2,219,488 | 10/1940 | Parker | 91/420 X |
|---|---|---|---|
| 3,595,264 | 7/1971 | Martin | 91/420 |
| 3,608,431 | 9/1971 | Pease, III | 91/1 |
| 3,748,968 | 7/1973 | Pinto | 279/4 X |
| 3,799,032 | 3/1974 | Honeycutt | 91/420 |
| 3,855,902 | 12/1974 | Kirst | 91/420 |
| 3,892,165 | 7/1975 | Lioux | 91/420 |
| 3,972,537 | 8/1976 | McClelland | 91/420 X |
| 3,986,437 | 10/1976 | Lioux | 91/420 X |
| 4,080,716 | 3/1978 | Dorp | 279/4 |

FOREIGN PATENT DOCUMENTS

| 1080547 | 8/1967 | United Kingdom . |
| 1139604 | 1/1969 | United Kingdom . |
| 1194983 | 6/1970 | United Kingdom . |
| 1424225 | 2/1976 | United Kingdom . |
| 1456316 | 11/1976 | United Kingdom . |

Primary Examiner—Irwin C. Cohen
Attorney, Agent, or Firm—Wegner & Bretschneider

[57] ABSTRACT

The present invention relates to a rotary hydraulic jack device. This jack device comprises a rotary hydraulic joint whose rotary part is formed by a tubular extension of a first end cover of the jack cylinder. Two check valves and the rotary joint are respectively inserted in two main pipes which alternately connect the two compartments of the jack cylinder to a source of pressurized hydraulic fluid and to a tank at atmospheric pressure. Each check valve is controlled by an auxiliary pipe connected to one of the main pipes upstream of the other check valve. The two check valves are respectively located in tight chambers arranged in the first end cover of the jack cylinder. This jack device may be used to control the part of clamping chuck of a machine tool.

7 Claims, 4 Drawing Figures

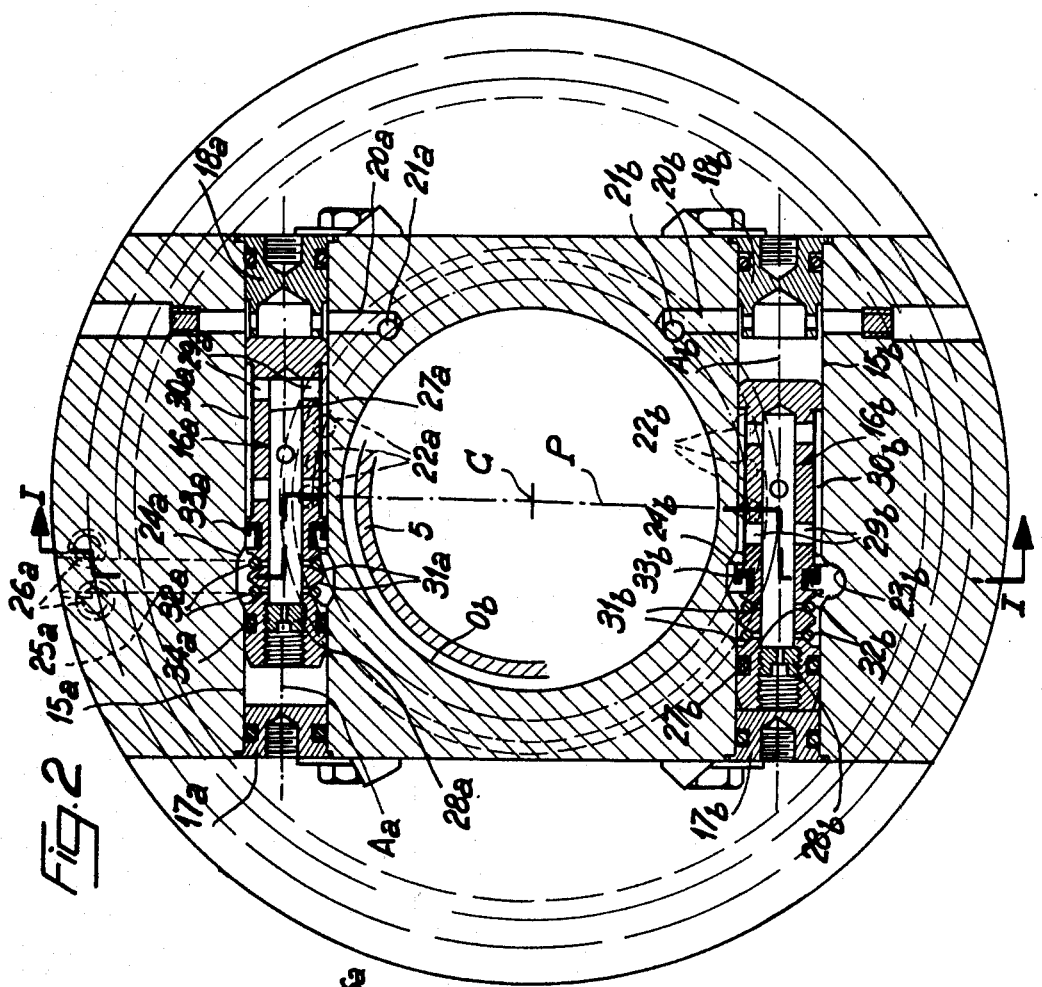
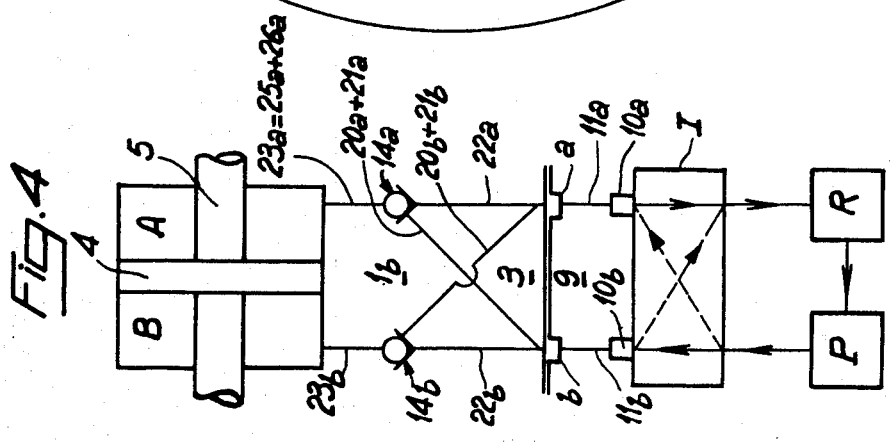

ROTARY HYDRAULIC JACK DEVICE

The present invention relates to a rotary hydraulic jack device, particularly for controlling a chuck for clamping a part to a machine tool.

U.S. Pat. No. 3,892,165 to Jean LIOUX describes a rotary hydraulic jack device comprising a rotary hydraulic joint, whose rotary part is formed by a tubular extension of one of the cylinder end covers of the rotary jack, two main pipes, which respectively issue into the two compartments of the jack cylinder and in each of which is inserted said rotary hydraulic joint, and a check valve, two auxiliary pipes, each of which serves to control the opening of one of the check valves and is connected to one of the main pipes upstream of the other check valve, and means for alternately connecting one of the two main pipes to a source of pressurised hydraulic fluid and the other main pipe, to a tank for said fluid at atmospheric pressure. This known hydraulic jack device has a perfect operational reliability. Thus, if in the position where a part is clamped by the machine tool chuck the previously supplied main pipe no longer receives pressurised hydraulic fluid due to any damage the check valve inserted in this main pipe maintains the pressure in the corresponding compartment of the jack cylinder, which prevents the accidental disclamping of the part, which would speed of the machine tool is high.

The hydraulic jack device described in the U.S. Patent cited above also has pressurised hydraulic fluid accumulators which provide the advantage of it being necessary to supply the hydraulic jack with the high control pressure only when the jack has to control a clamping or unclamping operation of the chuck, whilst a reduced feed pressure is always sufficient except during said operations. Therefore this known device requires relatively complex and costly fluid supply means.

Moreover in this known hydraulic jack device the two check valves and their control members are placed in axial bores of the tubular extension of one of the cylinder end cover. Consequently this tubular extension must have sufficient radial thickness which, for an annular jack with a central opening having a given diameter, imposes a lower limit to the internal diameter of the fixed part of the rotary hydraulic joint. This lower limit results as being disadvantageous particularly for an annular hydraulic jack used for controlling the clamping chuck of a machine tool rotating at a very high speed.

A chief object of the present invention is to design a rotary hydraulic jack device of the type described hereinbefore, which does not have the disadvantages referred to hereinbefore.

Another object of the present invention is to design a rotary hydraulic jack of the type described hereinbefore, in which the two check valves are respectively located in tight chambers arranged within the end cover of the jack cylinder which is integral with the tubular extension forming the rotary part of the rotary joint.

This feature of the rotary jack according to the present invention makes it possible to give a reduced thickness to the tubular extension of the said cylinder cover which forms the rotary part of the rotary joint, so that it is possible to reduce the internal diameter of the fixed part of the said rotary joint, which is particularly advantageous in the case of a annular jack device used for controlling the clamping chuck of a machine tool rotating at a high speed. Moreover, inasmuch as the hydraulic jack device according to the present invention does not have pressurised hydraulic fluid accumulators it can be supplied through simpler and less expensive means.

In particular for applications to machine tools rotating at high speeds it is desirable to balance as perfectly as possible the cylinder of a rotary hydraulic jack and to keep the movable member of each of its check valves as free as possible from the action of centrifugal forces. This end may be reached with the preferred embodiment of the present invention, in which the chambers for the two check valves are elongated recesses arranged on either side of the axis of the rotary jack, the respective axes of said elongated chambers being preferably perpendicular to a same diametral plane of said rotary jack.

The previously indicated features of the rotary hydraulic jack device according to the invention have the advantageous effect of ensuring the operational reliability of the machine tool, whilst preventing the part from being disclamped from the chuck as said part is being rotated and machined, even in the case of a possible failure of the supply to the hydraulic jack controlling the said chuck.

Still another object of the present invention is to ensure safe reliable operating conditions during the machine tool starting phase. This last object is achieved by an embodiment of the present invention, wherein said piston is mounted on a tubular sleeve extending to the outside of said rotary hydraulic joint, a disc or ring of a ferromagnetic material is fastened to the outside end of said tubular sleeve, and two magnetic sensors are mounted outside of the jack device to respectively detect the extreme positions of said disc or ring when said piston slides within said cylinder body, said extreme positions corresponding respectively to the part clamping and unclamping positions of the chuck of the machine tool.

Thus, by making the starting of the machine tool dependent on the signal supplied by one of the two magnetic sensors when the piston of the hydraulic jack is in its position corresponding to clamping of the part by the chuck, any risk of starting without the part being clamped by the chuck is eliminated, as are the accidents which could result therefrom.

The rotary hydraulic jack device according to the present invention is not restricted to be used for controlling the part clamping chuck of a machine tool. It may also be used for example for controlling the drive of the drill of a drilling machine, more specifically for vertical drilling operations in the oil and petroleum industry or for drilling in any direction in mines and quarries. It may also be used for controlling for example the engaging of a gear box and more generally whenever an axial load has to be applied to a hollow or solid rotating shaft.

A preferred embodiment of the rotary hydraulic jack device according to the invention is described in exemplified and non-limitative manner hereinafter in relation to the control of the part clamping chuck of a machine tool and with reference to the attached drawings, wherein show:

FIG. 1 the preferred embodiment in longitudinal section.

FIG. 2 a sectional view along the line II—II of FIG. 1.

Figure 3:
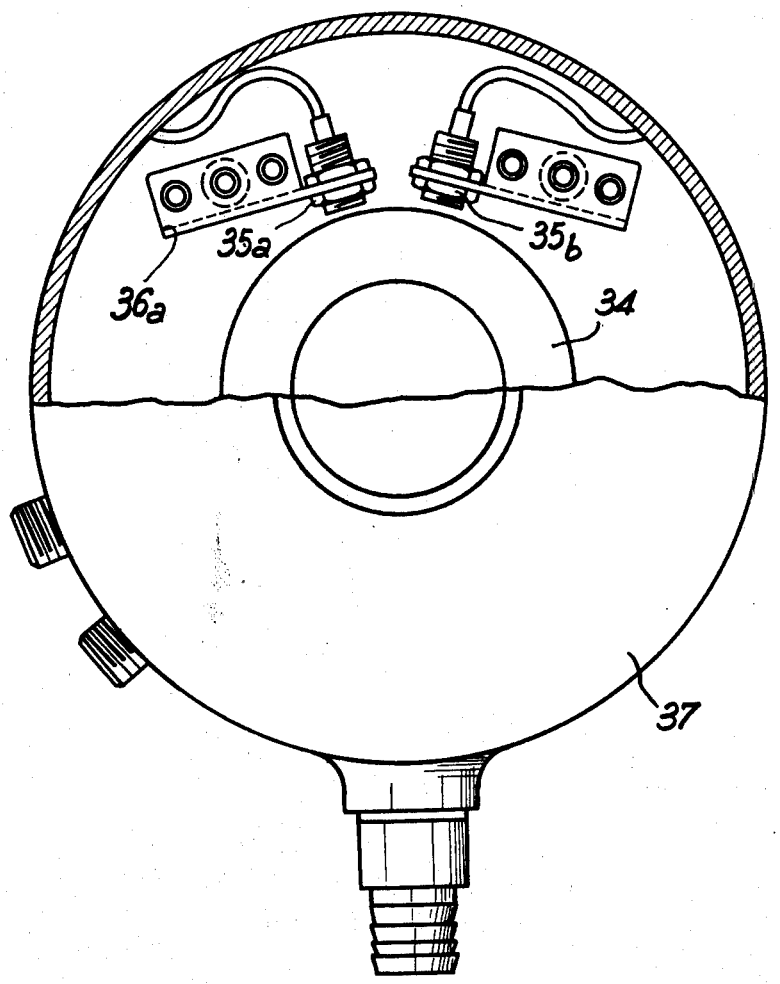

FIG. 3 a sectional view along the line III—III of FIG. 1.

FIG. 4 a diagram illustrating the circuit of the hydraulic jack of FIGS. 1 to 3.

The annular hydraulic jack device according to the present invention essentially comprises a cylinder body 1, a first cylinder cover 1a which may be fixed to the end of a not shown hollow spindle fixed to the machine tool by means of screws engaged in tapped holes such as 2 (FIG. 1) and a second cylinder cover 1b provided on the side opposite to cylinder body 1 with a tubular extension 3, whose internal diameter substantially corresponds to that of the central coaxial openings of the two cylinder covers 1a, 1b. According to the present invention this tubular extension 3 of cylinder cover 1b has a small radial thickness compared with its internal diameter. An annular piston 4 carried by a tubular sleeve 5 may freely slide in the sealed chamber defined by cylinder body 1 and the two cylinder covers 1a, 1b, so as to divide the latter into two compartments A, B which are sealingly insulated from one another by an annular joint 6 embedded in a peripheral groove of annular piston 4. Tubular sleeve 5 has an external diameter which is slightly smaller than the diameter of the openings of cylinder covers 1a, 1b and of tubular extension 3 in which it may freely slide to follow the displacements of annular piston 4 so as to exert a push or a pull towards the right or left in FIG. 1 on a not shown member, whose first end is for example screwed into an inner tapping 5a of the right-hand end of tubular sleeve 5, whilst its other end actuates the clamping chuck of a not shown machine tool. The arrangement is such that when annular piston 4 and tubular sleeve 5 occupy their extreme right-hand position shown in FIG. 1 the machine tool chuck is in the position of unclamping the part, whilst it is in the clamping position when members 4 and 5 occupy their extreme left-hand position. Annular joints such as 6a and 6b, embedded in grooves of internal bores of cylinder cover 1a and tubular extension 3 ensure the sealing of the two compartments A and B of the jack cylinder.

The angular setting of annular piston 4 relative to cylinder body 1 and its two covers is ensured by a rod 7, whose end is perpendicularly fixed to said annular piston 5, whilst its other end may slide freely in an opening 8 in the cylinder cover 1a.

The tubular extension 3 of cylinder cover 1b constitutes the shaft of a rotary hydraulic joint whose fixed part 9 is in the form of a ring, whose internal diameter is slightly larger than the external diameter of tubular extension 3. Four annular grooves are made in the inner cylindrical surface of fixed ring 9. In the median portion are provided grooves a and b which communicate respectively with fixed tubes 10a (FIG. 1) and 10b (not shown in the drawings) by means of channels such as 11a machined into the fixed ring 9. Two collecting grooves c and d, whose function will be explained hereinafter, are located close to the end of fixed ring 9 and roller bearings 12a, 12b located between its end and tubular extension 3.

The assembly of the annular jack, its rotary joint and fixed ring 9 is mounted within a sealed collecting casing 13, whose lower part is provided with a drainage pipe 13a.

According to the invention cover 1b of the cylinder of the hydraulic jack, with which is integral the tubular extension 3, has a sufficient axial thickness to receive appropriate chambers which serve as housings for two check valves 14a, 14b. In the preferred embodiment described the two chambers 15a, 15b respectively serve to house two check valves 14a, 14b which, as can be seen particularly in FIG. 2, are located on either side of the central opening 0b of cylinder cover 1b, symmetrically relative to its centre C (FIG. 2) and their respective axes Aa and Ab are perpendicular to a same diametral plane of the annular jack (whose outline is designated by P in FIG. 2). Due to this arrangement slides 16a and 16b (FIG. 2) of the two valves 14a, 14b, which may freely slide in chambers 15a, 15b, are free from the action of the centrifugal force, which is particularly intense when the annular jack is coupled to a machine tool rotating at high speed, and the jack cylinder is perfectly balanced.

In the present embodiment the housings or chambers of the two check valves are cylindrical; they consist of openings 15a, 15b are tightly sealed by terminal plugs such as 17a, 17b. Each of the slides 16a, 16b also has a substantially cylindrical shape and a length which is slightly less than that of the corresponding valve chamber, in such a way that each slide, e.g. 16a may be displaced within the corresponding chamber 15a between a first right-hand end position (position in which slide 16a is shown in FIG. 2) and a second left-hand end position (position in which slide 16b is shown). As a variant the chambers of the two check valves may have a prismatic shape and the corresponding slides shapes adapted thereto.

Into the first end (to the right in FIG. 2) of chamber 15a or 15b of each of the two check valves issues an auxiliary pipe which controls the opening of the valve in question. In the present embodiment this auxiliary pipe has a hole 20a or 20b which issues into a recess in plug 18a or 18b, which is opened facing the corresponding face of slide 16a or 16b, together with an axially orientated hole 21a or 21b which is extended towards the inside of tubular extension 3 so as to communicate by a not shown radial branch with the narrow gap provided between said tubular extension 3 and fixed ring 9, level with annular groove b in the case of hole 21a and annular groove a for hole 21b.

A main pipe, or more specifically the upstream section thereof 22a or 22b, issues into the median part of chamber 15a or 15b of each check valve through at least one and for example three separate holes. As can be seen in FIG. 1 the upstream section 22a or 22b of each main pipe consists of an axially directed hole which extends into tubular extension 3 and communicates with the narrow gap between members 3 and 9 level with annular groove a for main pipe section 22a and annular groove b for main pipe section 22b.

The downstream section 23a or 23b (relative to the corresponding check valve) of each main pipe issues into the median portion of the corresponding chamber 15a or 15b, specifically into an annular groove 24a or 24b which, relative to the outlets of the upstream section of the corresponding main pipe, 22a or 22b, is located near to the second end (to the left in FIG. 2) of said chamber. The downstream section 23a of the main pipe corresponding to check valve 14a consists of an opening 25a, extending into a plane perpendicular to the axis of the annular jack within cylinder cover 1b and of one or more axially directed openings 26a which prolongates the said opening 25a through the thickness of the wall of cylinder body 1 and which communicates by a lateral bypass with compartment A of the jack chamber (FIG. 1). The downstream section 23b of the main pipe corresponding to check valve 14b comprises only one axially directed opening which issues into compartment B of the jack chamber.

As can be seen in FIG. 2 each of the slides 16a, 16b has an axial blind channel 27a or 27b which communicates with the second end of chamber 15a or 15b (to the left of FIG. 2) via an appropriate jet 28a or 28b. Axial channel 27a or 27b of each slide communicates by means of holes 29a or 29b with that part of chamber 15a or 15b into which issues the upstream section 22a or 22b of the corresponding main pipe. In the preferred embodiment the holes such as 29a issue to the outside of the corresponding slide 16a into an annular groove 30a of limited depth machined in the lateral surface of said slide.

In the lateral surface of each slide are also provided two annular grooves of V-shaped cross-section 31a or 31b disposed axially in such a way that they face annular groove 24a or 24b machined in the side wall of chamber 15a or 15b, when the corresponding slide 16a or 16b occupies its first right-hand end position (slide 16a in FIG. 2). Several radial branches of axial channel 27a of the corresponding slide issue into the bottom of each of the annular grooves such as 31a and a ring of elastic material 32a or 32b, which in particular may have a toroidal shape, is secured at the bottom of each of said annular grooves 31a or 31b in such a way as to seal the radial branches of the axial channel 27a or 27b when no pressure difference exists between the latter and annular groove 24a or 24b. Each toroidal ring 32a or 32b, being made of elastic material and acting in the manner of a spinchter, forms, with the radial branches of the axial channel of the slide, a non-return valve. As can be seen in FIG. 2 for slide 16a the chamber defined by annular groove 24a in the side wall of chamber 15a and by the two annular grooves 31a of slide 16a is sealed to the right by a lip joint 33a and to the left by an O-ring 34a. Moreover when each slide occupies its second left-hand end position (slide 16b in FIG. 2) its lip joint 33b is leveled with annular groove 24b and as a result of the appropriate shaping of the lateral surface of slide 16b beyond lip joint there is a direct passage between the downstream section 23b of the corresponding main pipe and the outlets of its upstream section 22b.

In the present embodiment tubular sleeve 5, which carries the annular piston 4 of the jack, extends to the outside of the rotary hydraulic joint, and in particular of its rotating portion 3, and its outside end carries a ring or a disc 3a made of steel, i.e. a ferromagnetic material. Moreover two magnetic sensors 35a, 35b (see also FIG. 3) are fixed to the outside of the jack, particulary by means of angle brackets 36a, 36b carried by the inner wall of a cover 37 extending the collecting casing 13. The respective axial position of the two magnetic sensors 35a, 35b are chosen in such a way that they respectively detect the extreme positions of disc 3a and consequently those of the jack piston 4, corresponding respectively to the clamping and unclamping of the part by the chuck. Not shown known means utilise the output signals of the two magnetic sensors 35a and 35b to respectively authorise or prevent the rotation of the machine tool to which the hydraulic jack is coupled.

The operation of the hydraulic jack device described hereinbefore will now be explained by means of the diagram of FIG. 4, which shows in simplified manner the various pipes of the supply circuit of the two compartments A and B of the hydraulic jack, said pipes being designated by the same reference numerals as in FIGS. 1 to 3. In FIG. 4 P designates a pressurised hydraulic fluid source, R a hydraulic fluid reservoir et atmospheric pressure and I a known device for bringing about the alternate communication of tubes 10a and 10b, constituting the intakes of upstream sections 11a, 11b of the main pipes, with on the one hand source P and on the other with tank R.

As has been stated hereinbefore when the annular piston 4 of the jack occupies its extreme right-hand position in FIG. 1 the not shown chuck of the machine tool is in the unclamped position and the output signal of the corresponding magnetic sensor 35b prevents the supply of the machine tool drive motor. Obviously it is then compartment B of the jack which is filled with pressurised hydraulic fluid, whilst its compartment A is connected to tank R at atmospheric pressure. Slides 16a, 16b of the two check valves 14a, 14b consequently respectively occupy their second and first end positions, which is the opposite to what is shown in FIG. 2. When machining of a part is to take place a command is transmitted to device I (FIG. 4) in order to connect tube 10a, previously connected to tank R, to the pressurised fluid source P and tube 10b to tank R. Thus, pressurised hydraulic fluid passes via pipes or recesses 11a, a, 22a, 30a, 29a into the axial channel 27a of valve 16a, from which it escapes via jet 28a to pass into chamber 15a. The pressurised hydraulic fluid acting on the left-hand end of slide 16a then forces back the latter into its extreme right-hand position, illustrated in FIG. 2 during this movement slide 16a forces the oil contained in the right-hand end of chamber 15a into tube 10b and tank R by means of pipes or recesses 20a, 21a, b, 11b. Simultaneously slide 16b performs an inverse movement towards its left-hand second extreme position under the action of the pressurised hydraulic fluid which enters the right-hand end of chamber 15b by means of pipes or recesses 11a, a, 20b, 21b.

When the two slides 16a, 16b have reached their respective end positions shown in FIG. 2, corresponding for the first to the closing of check valve 14a and for the second to the opening of check valve 14b, the pressurised hydraulic fluid filling the axial channel 27a of slide 16a "forces" the spinchters comprising elastic rings 32a, due to the fact that the fluid filling compartment A of the jack is still at atmospheric pressure. Pressurised fluid is then introduced into compartment A by pipes 25a, 26a and starts to move annular piston 4 towards the left of FIG. 1. This movement of piston 4 has the effect of expelling from compartment B part of the hydraulic fluid filling the same, which is delivered to tube 10b and tank R by the following circuit: downstream section 23b of the main pipe; the direct passage which annular grooves 24b (when lip joint 33b is located at its level) and 30b provide between the inlet of downstream section 23b of main pipe on the one hand and the outlets of upstream section 22b of said main pipe on the other hand; annular groove b; and the upstream section 11b of said main pipe.

When as a result the pressurised hydraulic fluid entering compartment A annular piston 4 has reached its extreme left-hand position abutting against cylinder cover 1b, tubular sleeve 5 has itself exerted a pull directed towards the left of FIG. 1 on the control member of the not shown clamping chuck, which has the effect of actuating the latter. When ring 3a has come level with magnetic sensor 35a the output signal of the latter controls the opening of the supply of the drive motor of the machine tool, the arrangement being preferably such that the machine only starts after the complete clamping of the chuck.

At the end of machining of the part device I connects tube 10b to the pressurised fluid source P, so that the pressurised fluid forces the check valve 14b and enters compartment B of the jack, whilst the still pressurised fluid filling compartment A is returned to atmospheric pressure by the opening of check valve 14a under the action of the pressurised fluid supplied to it by pipes 20a and 21a. The opening of check valve 14a permits piston 4 to return part of the fluid contained in compartment A to tube 10a and tank R. Just prior to the unclamping of the chuck the output signal from sensor 35b controls the stoppage of the machine tool.

It is remarkable that as soon as the clamping of the chuck brings about a sufficient resistance to the displacement of piston 4 for the pressure of the fluid which has entered compartment A to become equal to the pressure of the fluid arriving directly from source P, which then fills the axial channel 27a of slide 16a, the spinchters comprising elastic rings 32a constrict again and close the corresponding check valve. Therefore it is not indispensable for tube 10a to be connected to the pressurised fluid source P throughout the machining of the part and there is no risk of the chuck becoming disengaged during this time. Thus, any risk of accidental unclamping of the chuck during machining is eliminated, even if the pressurised fluid source P or the pipes connecting it to valve 14a are damaged.

The embodiment of the invention described hereinbefore also comprises the following improvement: the two annular end grooves c and d are connected respectively by radial channels 38c, 38d machined in fixed ring 9 with an axially directed channel 40, preferably machined into the lower part of said ring 9. Furthermore a venturi nozzle 41 is arranged with axis substantially vertical in such a way as to connect the axially directed channel 40 to the opening of a drainage pipe 13a of collecting casing 13, whilst an annular gap 41a is provided between on the one hand the inner wall of pipe 13a and on the other the outer wall of venturi nozzle 41.

As a result of this arrangement the hydraulic fluid which, during operation, fills the annular grooves a, b flows out into the narrow gap between tubular extension 3 and fixed ring 9 up to the ends of said gap where said hydraulic fluid ensures the lubrication of bearings 12a, 12b, the excess hydraulic fluid being collected in the end collecting grooves c, d from which it passes via radial channels 38c, 38d into the axially directed channel 40 and is then returned to tank R at atmospheric pressure (FIG. 4) by venturi nozzle 41 and drainage pipe 13a of collecting casing 13. This flow of hydraulic fluid out of venturi nozzle 41 produces at annular gap 41a the suction of a certain fraction of the air contained in casing 13, so that within the latter a slight vacuum is produced, which prevents the escape of a mist of hydraulic fluid, particulary oil, due to the high speed rotation of the annular jack together with the movable member 3 of the rotary joint within said collecting casing 13. As a result of this vacuum a small quantity of fresh air passes back into the collecting casing 13 by means of upper pipes provided for this purpose. As a result the average temperature of the various fixed and rotating members within the collecting casing 13 is reduced.

The hereinbefore described embodiment may be varied as follows within the scope of the present invention: the slides 16a, 16b of the check valves may be constructed differently. The number and arrangement of the elastic rings 32a, 32b which serve as spinchters are variable. They may be replaced by one or more non-return valves of known construction and equivalent function. In addition to or in place of annular groove 30a provided in the lateral surface of each of the slides such as 16a, an identical annular groove may be provided in the lateral surface of chamber 15a near to the outlet of the upstream section 22a of the main pipe. Generally the slide of each check valve is to be arranged so that when the upstream section of the main pipe or the auxiliary pipe supplies pressurised fluid to the respective valve chamber, said slide is forced to abut respectively against the first or second ends of said valve chamber, whereby said slide reaches a first end position where it inserts at least one non return-member between the upstream and downstream sections of said main pipe, or in a second end position where said slide establishes a direct communication between the upstream and downstream sections of said main pipe.

We claim:

1. A rotary hydraulic jack device for controlling a clamping chuck comprising:

a rotary cylinder body with a first and second end cover tightly fastened thereto;

a piston slidably guided in said cylinder body defining therein two compartments tightly separated from each other;

a rotary hydraulic joint having a stationary part and a rotary part formed by a tubular extension of said cylinder first end cover;

first and second main pipes connected to said rotary part, said first main pipe carrying a pressurized fluid, said second main pipe providing a discharge path for a fluid;

first and second valves located within the first cylinder body end cover of said rotary cylinder body, said first valve being connected between one of said compartments and said first main pipe, said second valve being connected between said second main pipe and the remaining compartment, said valves comprising:

a housing, each of said housings being located opposite each other and symmetrical with respect to the rotational axis of said rotary cylinder, said housings having a first opening for communicating with one of said main pipes, and a second opening communicating with one of said compartments;

a slide member located within each housing and positionable between first and second ends of said housing, said slide member having at one end a jet communicating with a first end of said housing, and an axial channel connecting said jet via port means with that portion of the housing which communicates with one of said main pipes, said axial channel having lateral openings for communicating with said second opening, said lateral openings being closed by a pressure-sensitive annular elastic ring serving as a check valve for permitting flow towards said second opening, said slide member further including a sealing joint opening upon movement of said slide member to permit return flow from said second opening, first and second auxillary pipes connecting the second ends of each housing with a main pipe supplying the other housing;

said valves operating in response to pressure being applied to one of said main pipes, whereby a slide of a valve receiving said pressure is moved to the second end of said housing as fluid passes through said jet, and a slide of the remaining valve is moved to the first position as fluid enters said second end of the remaining valve through said auxillary pipes.

2. A device according to claim 1, wherein the housings for the slide members are elongated recesses arranged on either side of the axis of the rotary jack, the respective longitudinal axes of said elongated chambers being perpendicular to a same diametral plane of said rotary jack.

3. A device according to claim 1, wherein an annular recess is provided in the lateral surface of the slide of each valve, surrounding the lateral openings of the axial channel of said slide in which said annular elastic ring is present.

4. A device according to claim 1, wherein an annular recess is provided in the lateral wall of each valve housing, level with the first opening of the housing.

5. A device according to claim 1, wherein said piston is mounted on a tubular sleeve extending to the outside of said rotary hydraulic joint, a disc or ring of a ferromagnetic material is fastened to the outside end of said tubular sleeve, and two magnetic sensors are mounted outside of the jack device to respectively detect the extreme positions of said disc or ring when said piston slides within said cylinder body, said extreme positions corresponding respectively to the part clamping and unclamping positions of the chuck of the machine tool.

6. A device according to claim 1, wherein said rotary hydraulic joint is adapted to have systematic leaks of hydraulic liquid, said device further comprising means for collecting excess hydraulic liquid in said rotary joint, a collecting casing, conduit means for transferring the collected excess hydraulic liquid to said collecting casing, and a venturi nozzle inserted in said conduit means and arranged to generate a vacuum in said collecting casing.

7. A device according to claim 1, wherein said rotary hydraulic joint comprises bearings inserted between the respective ends of its stationary and rotating parts, and said means for collecting excess hydraulic liquid in said rotary joint consist of annular grooves respectively provided in the fixed part of said rotary joint near to its end bearings.

* * * * *

UNITED STATES PATENT AND TRADEMARK OFFICE
CERTIFICATE OF CORRECTION

PATENT NO. : 4,249,451

DATED : February 10, 1981

INVENTOR(S) : Le Moal

It is certified that error appears in the above-identified patent and that said Letters Patent is hereby corrected as shown below:

On the cover page, correct the Foreign Application

Application Priority Date to read:

--July 4, 1977 [FR] France 77 20474--

Signed and Sealed this

Fifth Day of July 1983

[SEAL]

*Attest:*

GERALD J. MOSSINGHOFF

*Attesting Officer*     *Commissioner of Patents and Trademarks*